United States Patent
Kageyama et al.

(10) Patent No.: US 7,318,589 B2
(45) Date of Patent: Jan. 15, 2008

(54) SEALING DEVICE AND ROTATION DETECTOR

(75) Inventors: Takeshi Kageyama, Okayama (JP); Katsura Koyagi, Osaka (JP); Masahiro Inoue, Nara (JP)

(73) Assignees: Jtekt Corporation, Osaka-shi, Osaka (JP); Uchiyama Manufacturing Corp., Okayama-Shi, Okayama (JP)

( * ) Notice: Subject to any disclaimer, the term of this patent is extended or adjusted under 35 U.S.C. 154(b) by 269 days.

(21) Appl. No.: 10/945,429

(22) Filed: Sep. 21, 2004

(65) Prior Publication Data

US 2005/0093245 A1    May 5, 2005

(30) Foreign Application Priority Data

Sep. 22, 2003 (JP) .......................... P.2003-330690
Sep. 22, 2003 (JP) .......................... P.2003-330691
Sep. 22, 2003 (JP) .......................... P.2003-330692
Sep. 22, 2003 (JP) .......................... P.2003-330693

(51) Int. Cl.
*F16J 15/32* (2006.01)

(52) U.S. Cl. ...................... 277/549; 277/317; 324/174; 73/862.193; 384/448

(58) Field of Classification Search ................ 277/549, 277/317, 353, 402, 562; 384/448; 310/90; 324/174, 207.21; 73/862.193
See application file for complete search history.

(56) References Cited

U.S. PATENT DOCUMENTS 5,261,752 A * 11/1993 Ouchi et al. ................ 384/448
5,407,213 A * 4/1995 Ouchi et al. ................ 277/317
6,892,587 B2 * 5/2005 Mizutani et al. ....... 73/862.193
7,084,537 B2 * 8/2006 Mizutani et al. .............. 310/90
2002/0126926 A1  9/2002 Ohtsuki et al.
2005/0174011 A1 * 8/2005 Mizutani et al. ............ 310/257

FOREIGN PATENT DOCUMENTS

| DE | 101 49 642 A1 | 4/2003 |
| EP | 1 058 119 A | 12/2000 |
| EP | 1 160 492 A | 12/2001 |
| FR | 2 574 501 | 6/1986 |
| JP | 10-132603 | 5/1998 |
| JP | 10-160744 | 6/1998 |
| JP | 2001-021576 | 1/2001 |
| JP | 2002-206557 | 7/2002 |

* cited by examiner

*Primary Examiner*—William L. Miller
(74) *Attorney, Agent, or Firm*—McGinn IP Law Group, PLLC

(57) ABSTRACT

A pulser ring and a second seal ring are separately formed. When a multipolar magnetic rotor of the pulser ring is bonded to an outer circumferential face of an outer cylindrical portion of an annular core portion, the multipolar magnetic rotor is opposed to a magnetic sensor in the radial direction. Due to the above structure, the multipolar magnetic rotor can be strongly supported by an outer cylindrical portion of the annular core portion. Therefore, even when a rotary centrifugal force is given to the multipolar magnetic rotor, it can not be swung in the radial direction. Accordingly, an interval of the multipolar magnetic rotor and the magnetic sensor in the radial direction, which are opposed to each other, can be maintained constant irrespective of an intensity of the centrifugal force.

13 Claims, 10 Drawing Sheets

SEALING DEVICE AND ROTATION DETECTOR

BACKGROUND OF THE INVENTION

The present invention relates to a sealing device in which two seals are combined with each other and into which a magnetic sensor and pulser ring to be used as a rotation detector are incorporated.

In the case of applying the above sealing device to a rolling bearing, the magnetic sensor is attached to a seal ring which is attached to a bearing ring on the stationary side, and the pulser ring is attached to a seal ring which is attached to a bearing ring on the rotary side. After a piece of rubber containing magnetic powder has been bonded to the seal ring attached to the bearing ring on the rotary side, N-poles and S-poles are alternately magnetized in the circumferential direction. Concerning this constitution, refer to JP-A-10-132603.

In the above example, since the pulser ring is directly bonded to the seal ring, the pulser ring is affected by a centrifugal force of rotation and swung in the radial direction. Accordingly, there is a possibility that an interval between the pulser ring and the magnetic sensor, which are opposed to each other, fluctuates in the radial direction.

The official gazette of JP-A-10-160744 discloses a sealing device referred to as a pack seal in which two seal rings are combined with each other. Either of these seal rings is composed in such a manner that a lip made of rubber is bonded to a metallic ring. In the case where the rolling bearing is of the inner ring rotation type, the magnetic sensor is attached to the first seal ring attached to an outer ring which is not rotated, and the pulser ring is attached to the second seal ring attached to an inner ring which is rotated.

In the above conventional example, the metallic ring is interposed between the magnetic sensor face and the pulser ring face which are opposed to each other. Due to this structure, it is impossible to reduce an interval between them exceeding a predetermined limit. Further, when lines of magnetic force generated by the pulser ring penetrate the metallic ring, an eddy current is generated. This eddy current may affect a detecting action of the magnetic sensor. Therefore, in order to further enhance the detecting accuracy of the magnetic sensor, the above structure leaves room for improvements.

The official gazette of JP-A-2001-21576 discloses a device in which the seal device is applied to a rolling bearing of the inner ring rotation type. The magnetic sensor is attached to one end face of the outer ring which is not rotated, and the magnetic ring is attached to one end face of the inner ring, which is rotated, via a support member. The support member is provided with a cylindrical portion and a flange portion extending inward in the radial direction. The magnetic ring is bonded to an outer circumferential face of the cylindrical portion of this support member. The magnetic ring is made of rubber containing magnetic powder, and N-poles and S-poles are alternately magnetized in the circumferential direction. A detection face of the magnetic sensor is perpendicular to a face to be detected of the magnetic ring.

In the above conventional example, since the detection face of the magnetic sensor is perpendicular to the face to be detected of the magnetic ring, when the position of the magnetic sensor and that of the magnetic ring are shifted from each other in the axial direction, a distance between the detecting face of the magnetic sensor and the face to be detected of the magnetic ring is extended. Therefore, it is necessary to increase the size of the piece of rubber containing magnetic powder so as to increase an intensity of the magnetic force. Further, it is necessary to employ a more sensitive magnetic sensor. Accordingly, the size of the rotation detector is increased and the manufacturing cost is raised.

The official gazette of the French Patent Publication No. FR2 574 501-A1 discloses a device in which a sealing device is applied to a rolling bearing. A magnetic sensor is attached to a seal ring attached to a bearing ring on the stationary side, and a pulser ring is attached to a seal ring attached to a bearing ring on the rotary side. In this case, the pulser ring is made of rubber containing magnetic powder and magnetized. One portion of the pulser ring comes into contact with a seal portion made of rubber provided in the seal ring and composes a portion of a tightly sealing portion for tightly sealing the inside of the bearing.

In the above conventional example, one portion of the pulser ring slidably coming into contact with the seal portion is made of rubber containing magnetic powder. Therefore, the magnetic powder acts as grinding particles, which cause abrasion in the opponent (the sealing portion on the stationary side) coming into contact with the pulser ring.

SUMMARY OF THE INVENTION

In view of the above problems caused in the conventional example, it is an object of the present invention to prevent the deterioration of the detecting accuracy of a magnetic sensor provided in a sealing device and enhance the detecting accuracy.

It is another object of the present invention to stably exhibit the sealing property of a sealing device over a long period of time.

In order to accomplish the above objects, the constitution of the present invention is characterized as follows.

(1) A sealing device comprising:
  a first seal ring that is fixed to an outer ring member;
  a second seal ring that is fixed to an inner ring member capable of relatively, coaxially rotating with respect to the outer ring member; and
  a magnetic sensor that is attached to the first seal ring,
  wherein the second seal ring includes:
    a metallic ring that is engaged with an outer circumference of the inner ring member;
    a lip that is bonded to the metallic ring, and comes into contact with the first seal ring; and
    a pulser ring that is provided in the metallic ring so that the pulser ring can be opposed to the magnetic sensor in the radial direction and is detected by the magnetic sensor,
  wherein the pulser ring includes:
    an annular core portion that includes an inner cylindrical portion provided on an outer circumference of the metallic ring, an outer cylindrical portion arranged coaxially with the inner cylindrical portion, and an annular plate portion for connecting the inner cylindrical portion with the outer cylindrical portion; and
    a multipolar magnetic rotor, in which N-poles and S-poles are alternately arranged in the circumferential direction, and which is bonded to the outer cylindrical portion.

(2) A sealing device according to (1), wherein the lip is made of rubber or resin.

(3) A sealing device according to (1), wherein the multipolar magnetic rotor is made of material on the basis of rubber or resin containing magnetic powder.

(4) A sealing device according to (1), wherein the inner cylindrical portion and the outer cylindrical portion are arranged inside the width in an axial direction defined by the first and the second seal ring.

(5) A sealing device according to (1), wherein a portion of the multipolar magnetic rotor fills a gap formed between the annular core portion and the metallic ring.

(6) A rotary detector comprising:
a sensor assembling body that is fixed to a outer ring member; and
a pulser ring that is fixed to an inner ring member capable of relatively, coaxially rotating with respect to the outer ring member, is to be detected by the sensor assembling body, and is opposed to the sensor assembling body in the radial direction,
wherein the sensor assembling body includes:
an annular ring that includes a cylindrical portion;
a magnetic sensor that is molded out of an outer body made of resin, and is arranged at a predetermined position on a outer circumferential side of the cylindrical portion; and
a window that is opened in a radial direction and is formed in a region of the metallic ring corresponding to the region in which the magnetic sensor is arranged.

(7) A rotary detector according to (6), wherein the pulser ring includes: an annular core portion having a cylindrical portion; and a multipolar magnet rotor that is bonded to an outer circumference of the cylindrical portion of the annular core portion and is opposed to the magnetic sensor in the radial direction.

(8) A rotary detector according to (6), wherein the sensor assembling body is press-fitted onto an inner circumferential face of the outer ring member, and the pulser ring is press-fitted onto an outer circumferential face of the inner ring member.

(9) A rotary detector according to (6), wherein the magnetic sensor is exposed from the resin outer body, and one face of the magnetic sensor is on the same face as the face of the window.

(10) A sealing device comprising:
a first seal ring that is fixed to an outer ring member;
a second seal ring that is fixed to an inner ring member capable of relatively, coaxially rotating with respect to the outer ring member; and
a magnetic sensor that is attached to the first seal ring,
wherein the second seal ring includes a pulser ring that is detected by the magnetic sensor and is provided in the metallic annular ring so that the second seal ring can be opposed to the magnetic sensor in a radial direction,
wherein the pulser ring includes; an annular core portion attached to an outer circumference of the second seal ring; and a multipolar magnetic rotor provided on an outer circumferential face of the cylindrical portion of the annular core portion, and
wherein N-poles and S-poles are alternately arranged in the multipolar magnetic rotor in a circumferential direction, and the multipolar magnetic rotor emits lines of magnetic force, which loop between the magnetic poles, in the radial direction onto the magnetic sensor side.

(11) A sealing device according to (10), wherein N-poles and S-poles are alternately formed and arranged in the circumferential direction of the multipolar magnetic roller by magnetizing a base of rubber or resin containing magnetic powder in the radial direction of the multipolar magnetic rotor.

(12) A sealing device comprising:
a first seal ring that is fixed to an outer ring member;
a second seal ring that is fixed to an inner ring member capable of relatively, coaxially rotating with respect to the outer ring member; and
a magnetic sensor that is attached to the first seal ring,
wherein the second seal ring includes:
a metallic ring that is engaged with an outer circumference of the inner ring member;
a lip that is bonded to the metallic ring, and comes into contact with the first seal ring; and
a multipolar magnetic rotor that is provided in the metallic ring so that the multipolar magnetic rotor can be opposed to the magnetic sensor in the radial direction, wherein the multipolar magnetic rotor includes N-poles and S-poles alternately arranged in the circumferential direction, a space being formed between the multipolar magnetic roller and the first seal ring in the radial direction.

(13) A sealing device according to (12), wherein the second seal ring includes an annular core portion engaged with an outer circumference of the metallic ring, and the multipolar magnetic rotor is bonded to an outer circumference of the annular core portion.

(14) A sealing device according to (12), wherein the multipolar magnetic rotor and the lip are separately formed.

DETAILED DESCRIPTION OF PREFERRED EMBODIMENTS

First Embodiment

Figure 1:
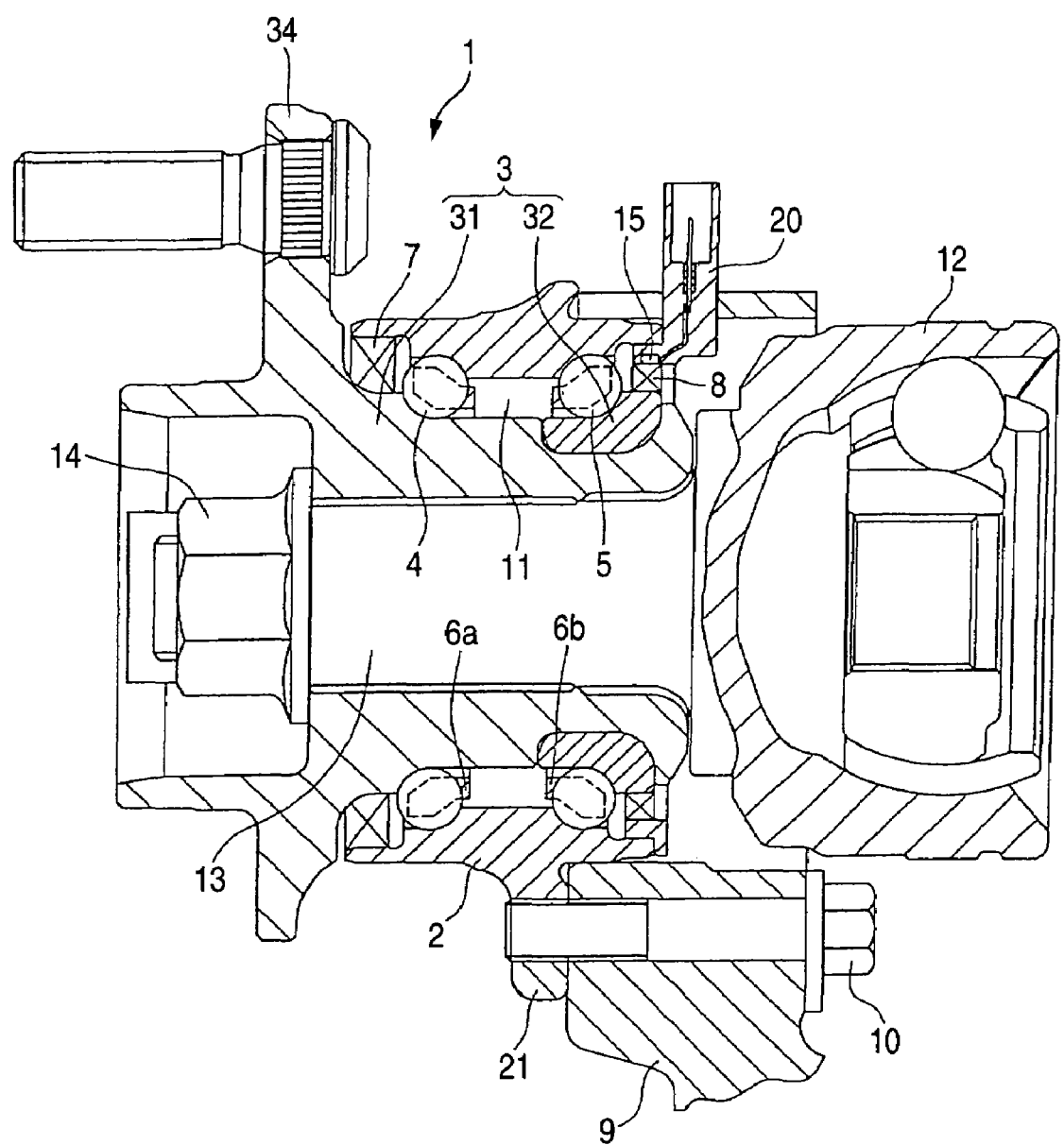
FIG. 1 is a sectional view showing a rolling bearing device into which a sealing device of the first embodiment of the present invention is incorporated.

FIGS. 1 to 5 are views showing the first embodiment of the present invention. In this embodiment, explanations are made into a case in which a sealing device of the present invention is incorporated into the rolling bearing device 1 used for a drive wheel of an automobile. In FIG. 1, the left of the rolling bearing device 1 is the outer side of the vehicle, and the right of the rolling bearing device 1 is the inner side of the vehicle.

The inner shaft member 3 is pivotally supported by the outer ring member 2, which is fixed not to be rotated, round the axis via two rows of rolling elements (for example, balls) which are respectively arranged at regular intervals on the circumference by the crown-shaped cages 6a, 6b.

On the outer circumferential face of the outer ring member 2, the flange portion 21 extending outside in the radial direction is formed. When the flange portion 21 is fixed to the knuckle 9, which is a portion of the vehicle body, by the bolts 10, the outer ring member 2 is fixed being not rotated.

The inner shaft member 3 includes: an inner shaft 31; and an inner ring 32 used for a single row angular ball bearing. The inner ring 32 is attached to the inner side of the barrel portion of the inner shaft 31. When an end portion of the inner shaft 31 on the inner side of the vehicle is rolling-calked outward in the radial direction, the inner ring 32 can be integrated with the inner shaft 31.

Two rows of rolling elements 4, 5 are interposed between two raceway tracks, which are provided on the inner circumferential face of the outer ring member 2 in the axial direction, and the raceway track, which is provided on the outer circumferential face of the inner shaft 31 and the raceway track which is provided on the outer circumferential face of the inner ring 32.

On the outer circumferential face of the inner shaft 31, on the outer side of the vehicle, the flange portion 34 extending outward in the radial direction is integrally formed. Although not shown in the drawing, a brake disk and a wheel are attached to the flange portion 34. The inner shaft 13 integrally formed in the bowl-shaped outer ring 12 of a constant velocity joint (CVJ) is spline-engaged in the central hole of the inner shaft 31. When the nut 14 is screwed to the outer side end portion of this shaft 13, the bowl-shaped outer ring 12 is integrated with the inner shaft member 3.

On both sides of the space formed between the outer ring 2 and the inner shaft member 3 in the axial direction, the first sealing device 7 and the second sealing device 8 are attached. Both the sealing devices 7, 8 prevent the lubricant from leaking outside from the annular space 11 in which the rolling elements 4, 5 are arranged. At the same time, both the sealing devices 7, 8 prevent the muddy water from getting into the annular space 11 from the outside.

Although the detail are not shown in the drawing, the first sealing device 7 arranged on the outer side of the vehicle is composed in such a manner that a lip made of rubber, which comes into slide contact with the inner shaft 31, is bonded to a metallic ring inwardly attached the outer ring 2.

Figure 2:
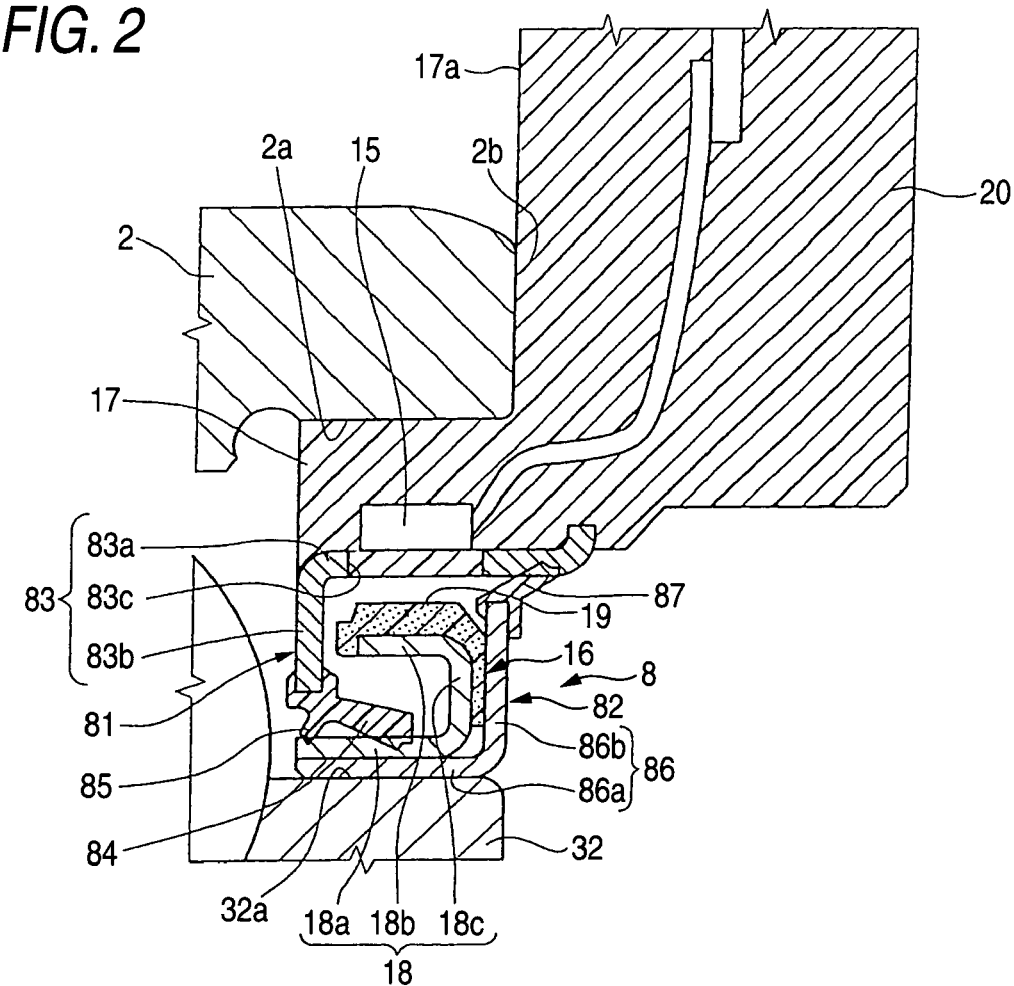
FIG. 2 is an enlarged view showing the second sealing device illustrated in FIG. 1.

As shown in FIG. 2, the second sealing device 8 arranged on the inner side of the vehicle is composed in such a manner that the first seal ring 81 and the second seal ring 82 are combined with each other. The second sealing device 8 is referred to as a pack seal. As a rotation detector for detecting a state of rotation of the inner shaft member 3 (the inner shaft 31 and the inner ring 32) such as a phase of rotation, rotation speed, number of rotations and direction of rotation, the magnetic sensor 15 and the pulser ring 16 are incorporated into this second sealing device 8. The structure of the second sealing device 8 will be explained in detail as follows.

The first seal ring 81 is attached to the outer ring member 2. The first seal ring 81 is composed in such a manner that the main lip 84 and the auxiliary lip 85 are attached to the first metallic ring 83. The first metallic ring 83 includes: a cylindrical portion 83a; and a flange portion 83b extending from the inner end of the cylindrical portion 83a in the axial direction to the inside in the radial direction. The main lip 84 and the auxiliary lip 85 are bonded to an inner circumference of the flange portion 83b by vulcanization. The outer body 17 made of resin of a predetermined thickness is laminated on the entire outer circumference of the cylindrical portion 83a in the first metallic ring 83, and the magnetic sensor 15 is embedded in the outer body 17 made of resin. At a predetermined position on the circumference of the outer body 17 made of resin, the female type connector 20 for connecting the magnetic sensor 15 with the harness (not shown), which is connected to the electronic circuit of the vehicle body, is integrally formed under the condition that the female type connector 20 protrudes outward in the radial direction.

Figure 5:
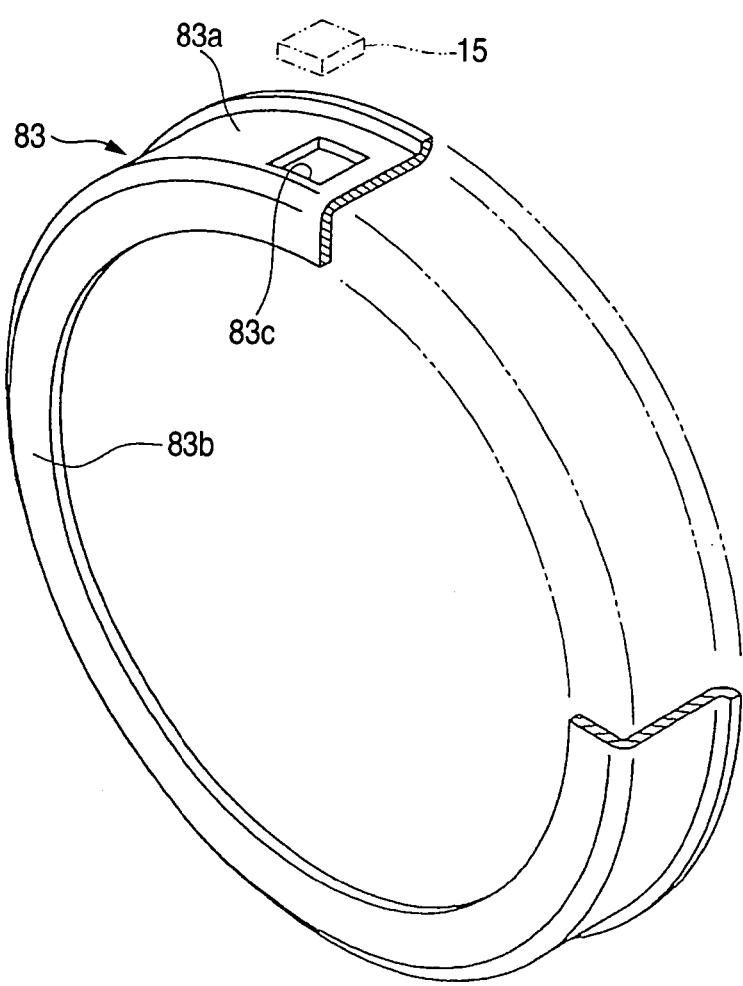
FIG. 5 is a perspective view showing the first metallic ring illustrated in FIG. 2.

In this connection, in the region in which the magnetic sensor 15 is arranged in the cylindrical portion 83b of the first metallic ring 83, as shown in FIG. 5, the window 83c open to the inside and outside in the radial direction is provided. The size and shape of this window 83c are larger than the size and shape of the magnetic sensor 15 when the view is taken in the radial direction. Alternatively, the size and shape of this window 83c are substantially the same as the size and shape of the magnetic sensor 15 when the view is taken in the radial direction. When the window 83c is provided as described above, no metallic member is interposed between the magnetic sensor 15 and the pulser ring 16. In this connection, the window 83c is provided so that the window 83c can not reach a region in which the lip 87 of the second seal ring 82 in the radial direction slidably comes into contact in the first metallic ring 83. As shown in FIG. 5, the magnetic sensor 15 is arranged so that the detecting face of the magnetic sensor 15 can be on the same face as the face of the opening end of the window 83c on the outer diameter side. Further, the outer body 17 made of resin is filled in the window 83c.

The second seal ring 82 is attached to the inner ring 32. The second seal ring 82 is composed in such a manner that the lip 87 in the radial direction is attached to the second metallic ring 86. The second metallic ring 86 includes: a cylindrical portion 86a; and a flange portion 86b formed at the outer end of the cylindrical portion 86a in the axial direction in such a manner that the flange portion 86b extends outward in the radial direction. The lip 87 in the radial direction is bonded to the outer circumference of the flange portion 86b by vulcanization. The pulser ring 16 is attached to this second seal ring 82.

In this connection, the lips 84, 85, 87 are made of rubber such as nitrile butadiene rubber (NBR). However, the lips 84, 85, 87 may be made of appropriate resin.

The pulser ring 16 is composed in such a manner that the multipolar magnetic rotor 19 is bonded to the annular core portion 18. The annular core portion 18 is composed in such a manner that the outer end side of the inner cylindrical portion 18a in the axial direction and the outer end side of the outer cylindrical portion 18b in the axial direction, which are coaxially arranged in the radial direction, are integrally connected with each other by the annular plate portion 18c.

Figure 3:
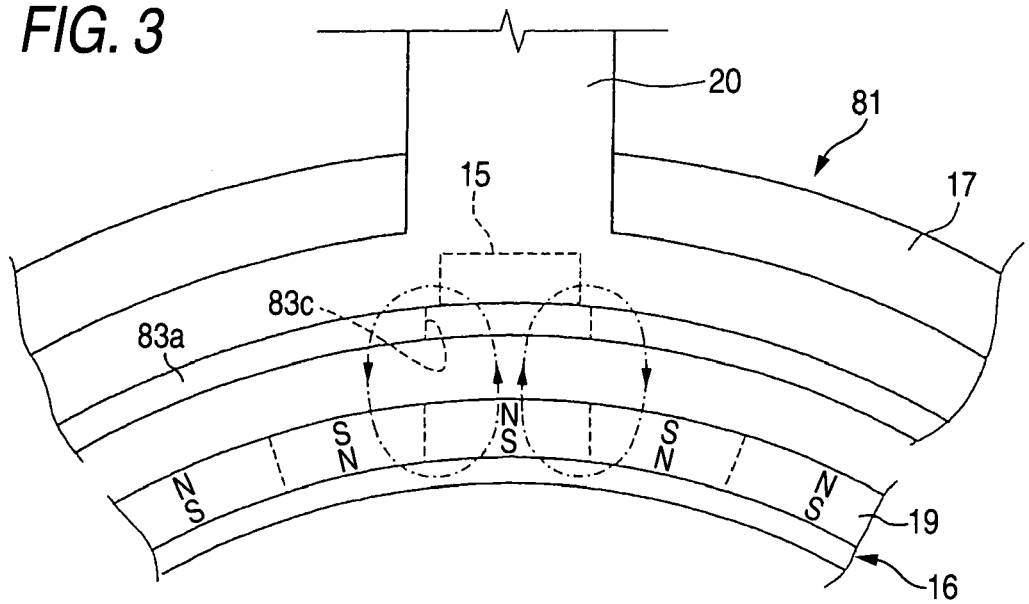
FIG. 3 is a front view showing the rotation detector illustrated in FIG. 2.
Figure 4:
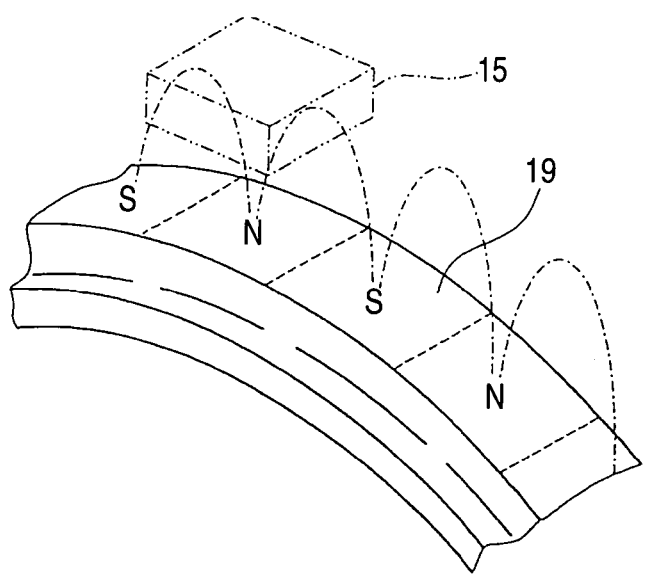
FIG. 4 is a perspective view showing a model of the circumstances of lines of magnetic force emitted from the pulser ring illustrated in FIG. 2.

The multipolar magnetic rotor 19 is composed in such a manner that rubber such as hydride nitrile butadiene rubber (H-NBR) or resin containing magnetic powder is bonded to an outer circumferential face of the outer cylindrical portion 18b of the annular core portion 18 by vulcanization, and magnetization is conducted in the radial direction so that N-pole and S-poles can be alternately arranged in the circumferential direction. Between the multipolar magnetic rotor 19 and the first metallic ring 83, a space is provided in the radial direction so that the multipolar magnetic rotor 19 can not contacted with the first metallic ring 83. As shown in FIGS. 3 and 4, this multipolar magnetic rotor 19 emits lines of magnetic force to the outside which loop the magnetic poles adjacent to each other in the circumferential direction. In this connection, raw material of the multipolar magnetic rotor 19 is filled so that the outside of the annular plate portion 18c can be covered with the raw material, that is, the raw material is filled into a gap formed between the annular core portion 18 and the second metallic ring 86. Therefore, it is possible to prevent the outside water from getting into the engaging face on which the annular core portion 18 and the second metallic ring 86 are engaged. It is possible to avoid providing the portion into which the raw material of the multipolar magnetic rotor 19 is filled.

When the inner cylindrical portion 18a of the annular core portion 18 is engaged with the cylindrical portion 86a of the second metallic ring 86, the pulser ring 16 is attached to the second seal ring 82, and a face of the pulser ring 16 to be detected is opposed to the detection face of the magnetic sensor 15 in the radial direction. Due to the foregoing, as shown in FIGS. 3 and 4, lines of magnetic force, which loop the magnetic poles adjacent to each other in the circumferential direction in the multipolar magnetic rotor 19 of the pulser ring 16, are emitted to the outer diameter side and enter the detection face of the magnetic sensor 15.

In this connection, since the magnetic sensor 15 is attached to the first metallic ring 83, for example, the first metallic ring 83 is made of non-magnetic material such as non-magnetic stainless steel (SUS304 stipulated by JIS). Concerning the annular core portion 18, in order for the annular core portion 18 to be formed into a magnetic passage for converging the lines of magnetic force which are emitted from the multipolar core portion 18 to the inner diameter sides for example, the annular core portion 18 is made of magnetic material such as magnetic stainless steel (SUS 430 stipulated by JIS). The outer body 17 made of resin for molding the magnetic sensor 15 is made of non-magnetic resin such as polyphenylene sulfide (PPS), polybutylene terephthalate (PBT) and polyamide (PA), that is, the outer body 17 made of resin for molding the magnetic sensor 15 is made of engineering plastics. Although not shown in the drawing, lubricant such as grease is enclosed into a space surrounded by the first seal ring 81 and the second seal ring 82.

The second sealing device 8 is assembled as follows. The first seal ring 81 and the second seal ring 82, to which the pulser ring 16 is integrally attached, are temporarily assembled being tied to each other. The second metallic ring 86 is press-fitted into the shoulder portion 32a of the outer circumferential face of the inner ring 32, and the outer body 17 made of resin of the first seal ring 81 is press-fitted into the shoulder portion 2a of the inner circumferential face of the outer ring 2. When the flange portion 17a of the outer body 17 made of resin is contacted with the end face 2b of the outer ring 2 on the inner side of the vehicle, the first seal ring 81 is positioned. In the above condition, the main lip 84 and the auxiliary lip 85 of the first seal ring 81 are made to come into contact with an outer circumferential face of the inner cylinder portion 18a of the annular core portion 18, and the lip 87 in the radial direction of the second seal ring 82 is contacted with the inner circumferential face of the cylindrical portion 83a of the first metallic ring 83. Since the lip 87 in the radial direction of the second seal ring 82 is arranged outside the pulser ring 16, it is possible to prevent the pulser ring 16 from being stained with dust. Therefore, the deterioration of accuracy of detection can be avoided. Further, since the pulser ring 16 is isolated from the rolling elements 5 and the raceway track by the main lip 84 and the auxiliary lip 85, it is possible to prevent the metallic abrasion powder, which is generated when the rolling elements 5 are rotated, from attaching to the pulser ring 16. Therefore, it is possible to prevent the deterioration of accuracy of detection.

As explained above, in the second sealing device 8, the second seal ring 82 and the pulser ring 16 are separately formed, and the multipolar magnetic rotor 19 of the pulser ring 16 is bonded to an outer circumferential face of the outer cylindrical portion 18b of the annular core portion 18. Therefore, the multipolar magnetic rotor 19 is strongly supported by the outer cylindrical portion 18b of the annular core portion 18. Accordingly, even when a rotary centrifugal force is given to the multipolar magnetic rotor 19, it can not be swung in the radial direction. Due to the foregoing, an interval in the radial direction of the magnetic sensor 15 and the multipolar magnetic rotor 19, which are opposed to each other, can be maintained constant irrespective of an intensity of the centrifugal force. Accordingly, the accuracy of detection can be enhanced. Further, it is possible to individually, simply manufacture the pulser ring 16 and the second seal ring 82. Therefore, the manufacturing cost can be reduced.

Especially, in the embodiment described above, since the inner cylindrical portion 18a and the outer cylindrical portion 18b of the annular core portion 18 are arranged in the width in the axial direction of the first seal ring 81 and the second seal ring 82, it is unnecessary that the width in the axial direction of the entire second sealing device 8 is extended. Accordingly, the entire device can be made compact. When the width in the axial direction of the pulser ring 16 is made maximum in the range of an interval in the axial direction of the first seal ring 81 and the second seal ring 82, as compared with a case in which the pulser ring 16 is bonded to the side of the annular plate portion 18c of the annular core portion 18, an area in which the pulser ring 16 and the magnetic sensor 15 are opposed to each other can be extended. Therefore, the detecting accuracy of the magnetic sensor 15 can be enhanced as highly as possible.

In the second sealing device 8, no metallic members are interposed between the magnetic sensor 15 attached to the first seal ring 81 and the multipolar magnetic rotor 19 of the pulser ring 16 attached to the second seal ring 82. Therefore, the lines of magnetic force generated by the multipolar magnetic rotor 19 in the rotating operation pass through the window 83c of the annular core portion 8. Accordingly, there is no possibility that an eddy current is generated in the neighborhood of the detecting face of the magnetic sensor 15 like the conventional example. Therefore, it is possible to prevent the occurrence of a conventional problem caused by the eddy current. Further, it is possible to reduce an interval between the magnetic sensor 15 and the multipolar magnetic rotor 19 which are opposed to each other. Due to the synergism, the detecting accuracy of the magnetic sensor 15 can be enhanced.

In the second sealing device 8, the multipolar magnetic rotor 19 of the pulser ring 16 is bonded to an outer circumferential face of the outer cylindrical portion 18b of the annular core portion 18, and the lines of magnetic force, which loop the magnetic poles adjacent to each other in the circumferential direction of the multipolar magnetic rotor 19, are emitted to the outer diameter side, that is, to the magnetic sensor 15 side. Due to this structure, even when the position of the magnetic sensor 15 and that of the pulser ring 16 are shifted from each other in the axial direction, the lines of magnetic force emitted from the multipolar magnetic rotor 19 can easily get onto the detecting face of the magnetic sensor 15. Therefore, the lines of magnetic force emitted from the multipolar magnetic rotor 19 are seldom affected by the positional deviation in the axial direction. Accordingly, the detecting accuracy of the magnetic sensor 15 is not deteriorated.

In the second sealing device 8, the multipolar magnetic rotor 19 of the pulser ring 16 is provided separately from the lip 87 in the radial direction of the second seal ring 82, and the lip 87 in the radial direction is made of rubber into which magnetic powder, which could become abrasion particles, is not mixed. Therefore, the first metallic ring 83, which is an opponent of contact of the lip 87 in the radial direction, can not be abraded. Due to the foregoing, the tightly sealing property can be exhibited over a long period of time.

Figure 7:
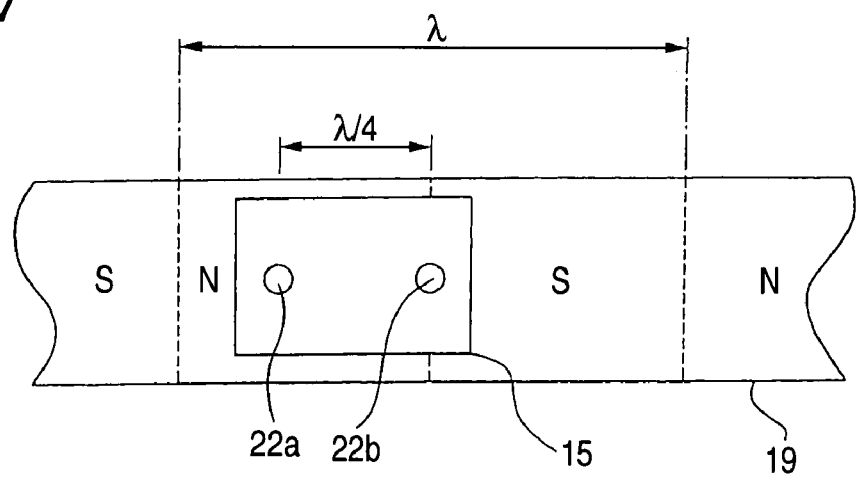
FIG. 7 is a schematic illustration in the case where a magnetic sensor is used as a sensor for detecting the normal and the reverse direction.
Figure 8:
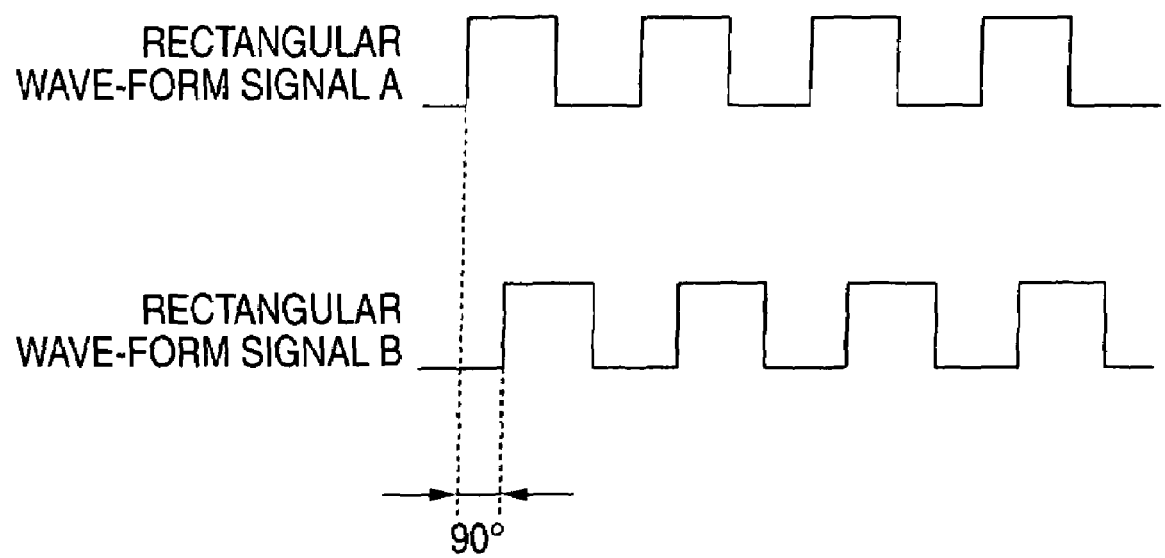
FIG. 8 is a view showing a detection signal outputted from the sensor for detecting the normal and the reverse direction illustrated in FIG. 7.

For example, as shown in FIG. 7, the magnetic sensor 15 can be a detection sensor for detecting the normal and the reverse defection composed of two sensor elements 22a, 22b such as hall elements or magnetic resistance elements. Two sensors 22a, 22b are arranged separately from each other in the circumferential direction. The interval of the two sensors 22a, 22b is an interval ($\lambda$/4) at which the output phase of one sensor and that of the other sensor are shifted by 90° from each other. In this case, $\lambda$ is a magnetization pitch of the multipolar magnetic rotor 19. In this case, the magnetization pitch is defined as a total length of the magnetization length in the circumferential direction of N-pole and the magnetization length in the circumferential direction of S-pole which is adjacent to N-pole. When one sensor element 22a outputs a rectangular wave-form signal A shown in FIG. 8, the other sensor element 22b outputs a rectangular wave-form signal B, the phase of which is shifted from the phase of the rectangular wave-form signal A by 90°. That is, when an opposing state of the multipolar magnetic rotor 19 with respect to the detection sensor for detecting the normal and the reverse direction is changed according to the rotating speed or the rotating direction of the multipolar magnetic rotor 19, the phase and the period of the phase of the rectangular wave-form signal, which is outputted from each sensor element 22a, 22b of the detection sensor 15 for detecting the normal and the reverse direction, are changed. Therefore, when both the rectangular wave-form signals are processed, the rotating phase, the rotating speed, the number of rotations and the rotating direction can be find.

Second Embodiment

Figure 6:
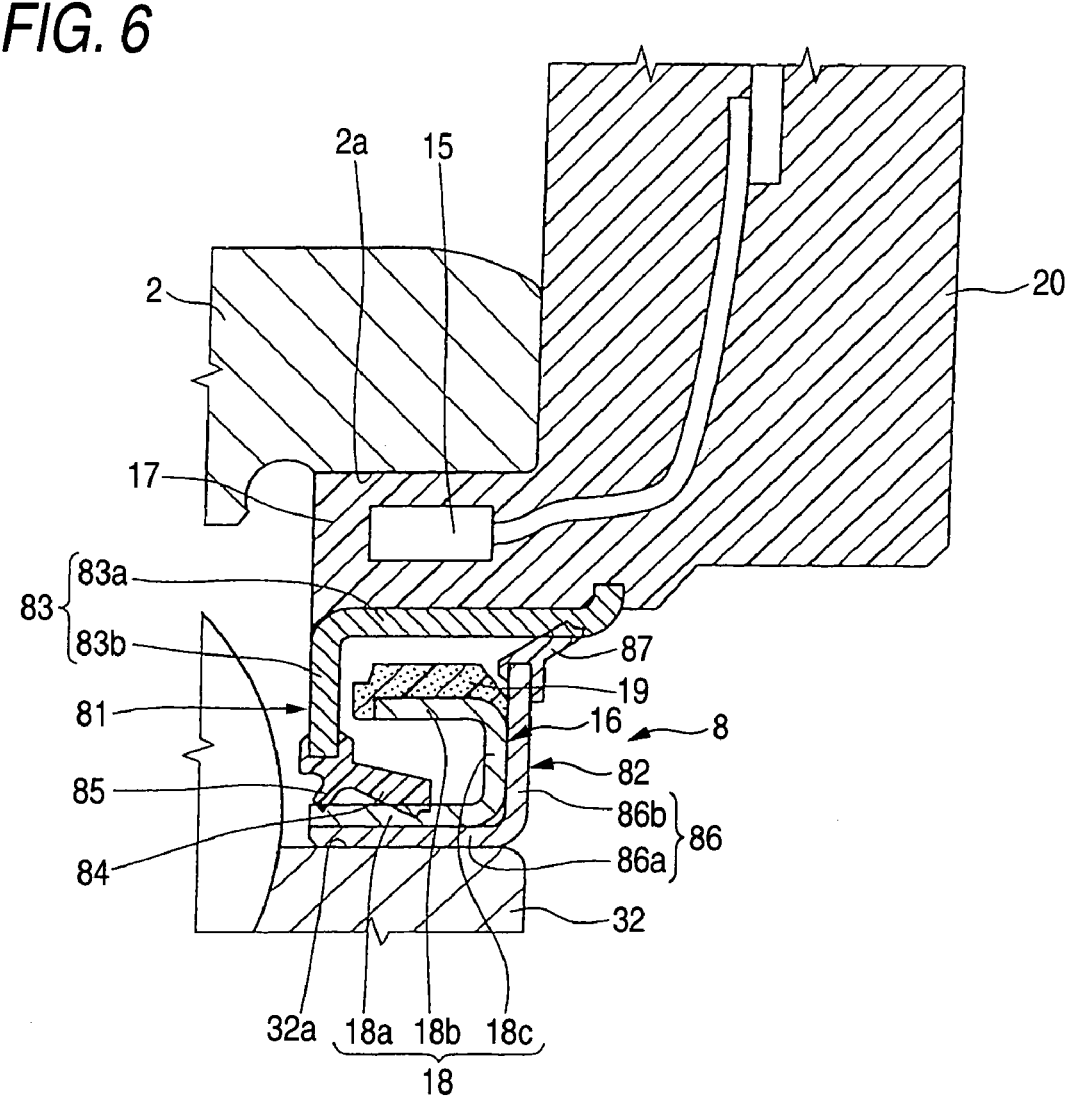
FIG. 6 is a view showing the second embodiment of the present invention, wherein the view corresponds to FIG. 2.

FIG. 6 is a view showing the second embodiment of the present invention. As shown in FIG. 6, the multipolar magnetic rotor 19 of the pulser ring 16 is bonded only onto the outer circumferential face of the outer cylindrical portion 18b of the annular core portion 18. That is, the present invention includes a constitution in which raw material of the multipolar magnetic rotor 19 is not filled to cover the outside of the annular plate portion 18c. In this structure, this embodiment is different from the first embodiment described before. In this connection, in this case, the window 83c is not provided in the first metallic ring 83 illustrated in FIG. 6. In this case, since no portion is provided in which the raw material of the multipolar magnetic rotor 19 is filled, the width of the outer cylindrical portion 18b in the axial direction can be extended. Therefore, the width of magnetization of the multipolar magnetic rotor 19 can be extended and the detecting accuracy can be enhanced.

Third Embodiment

Figure 9:
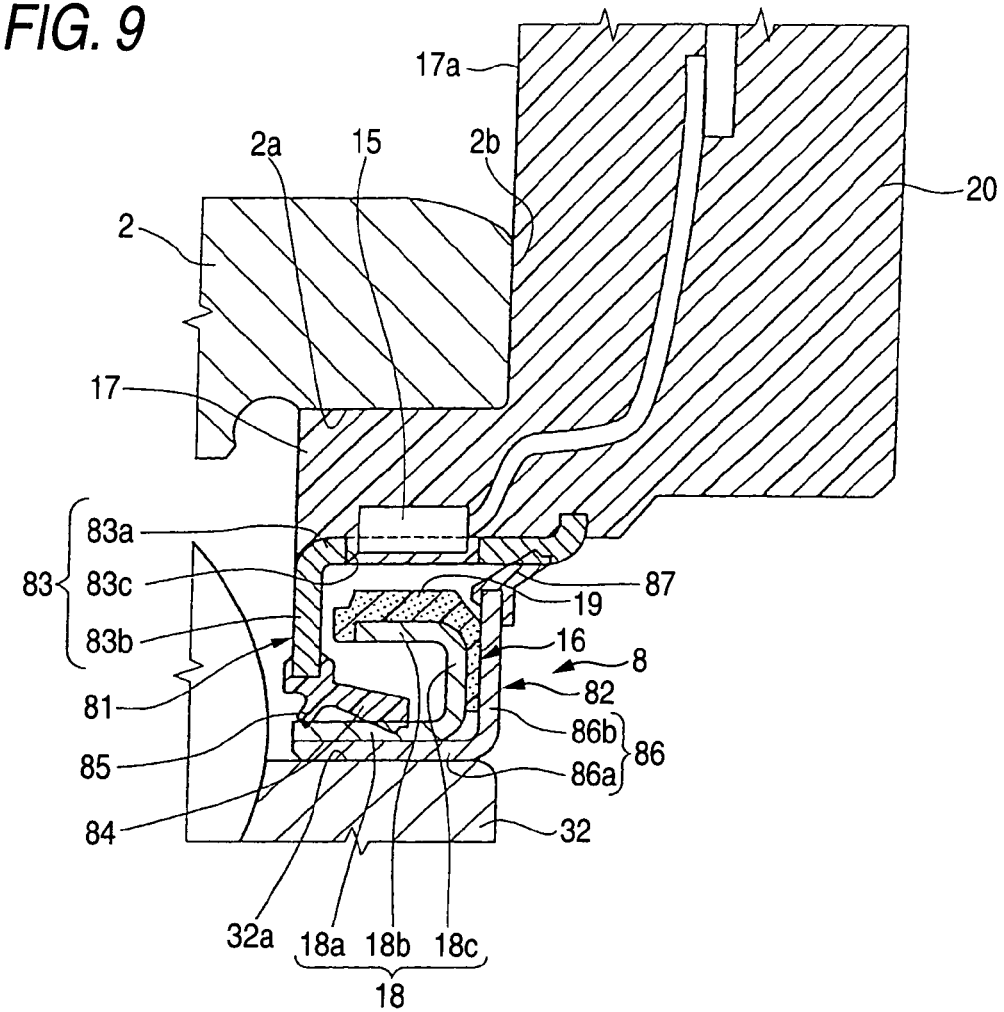
FIG. 9 is a view showing the third embodiment of the present invention, wherein the view corresponds to FIG. 2.
Figure 10:
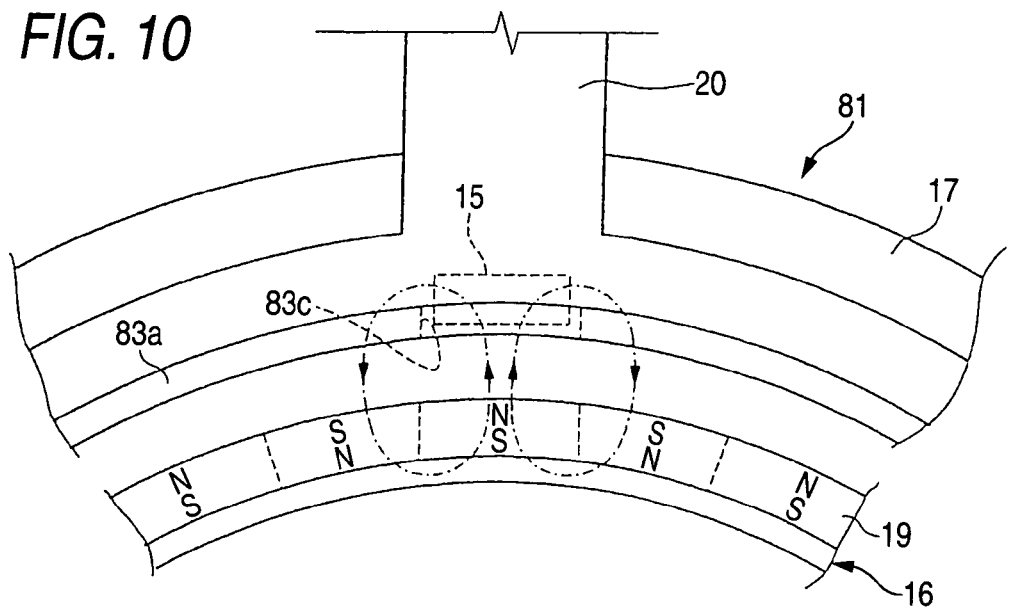
FIG. 10 is a view showing the sealing device illustrated in FIG. 9, wherein the view corresponds to FIG. 3.

FIGS. 9 and 10 are views showing the third embodiment. The magnetic sensor 15 may be accommodated in the window 83c as shown in FIGS. 9 and 10.

Fourth Embodiment

Figure 11:
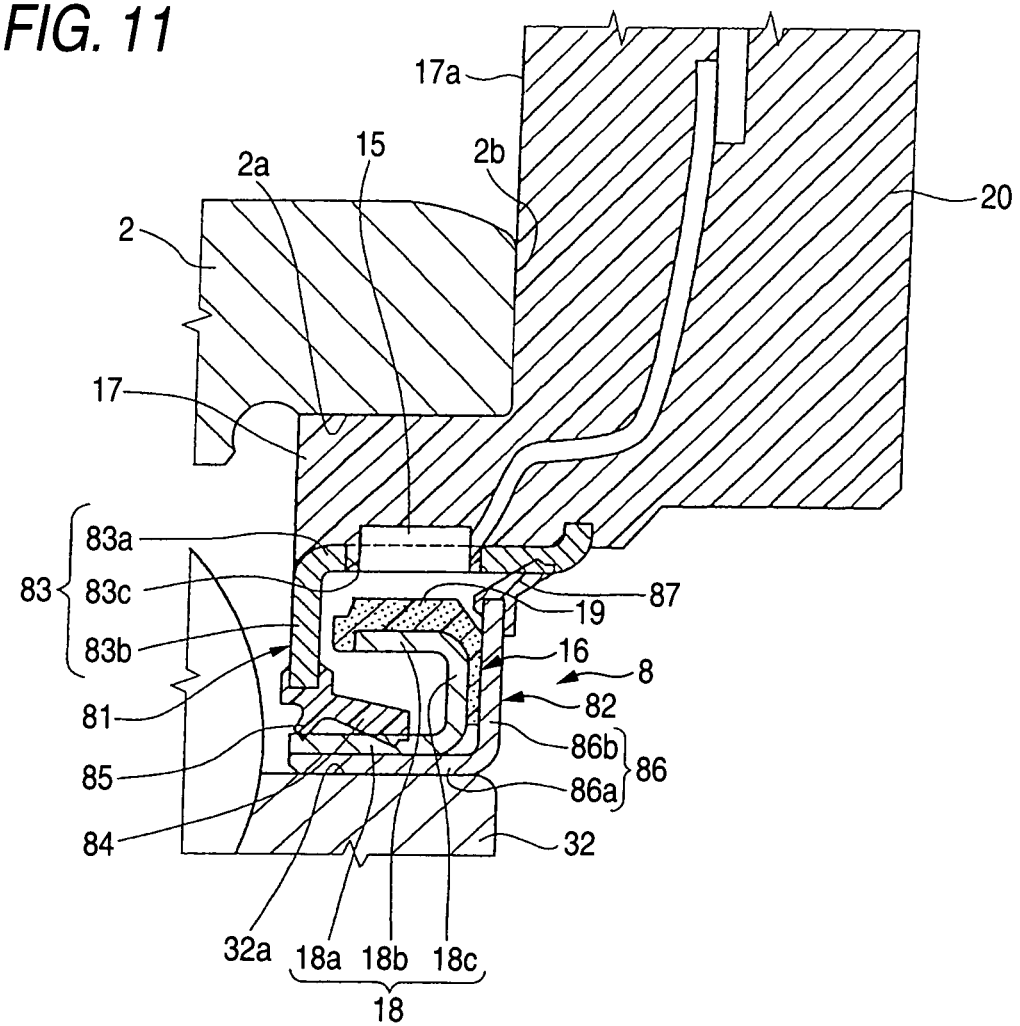
FIG. 11 is a view showing the fourth embodiment of the present invention, wherein the view corresponds to FIG. 2.
Figure 12:
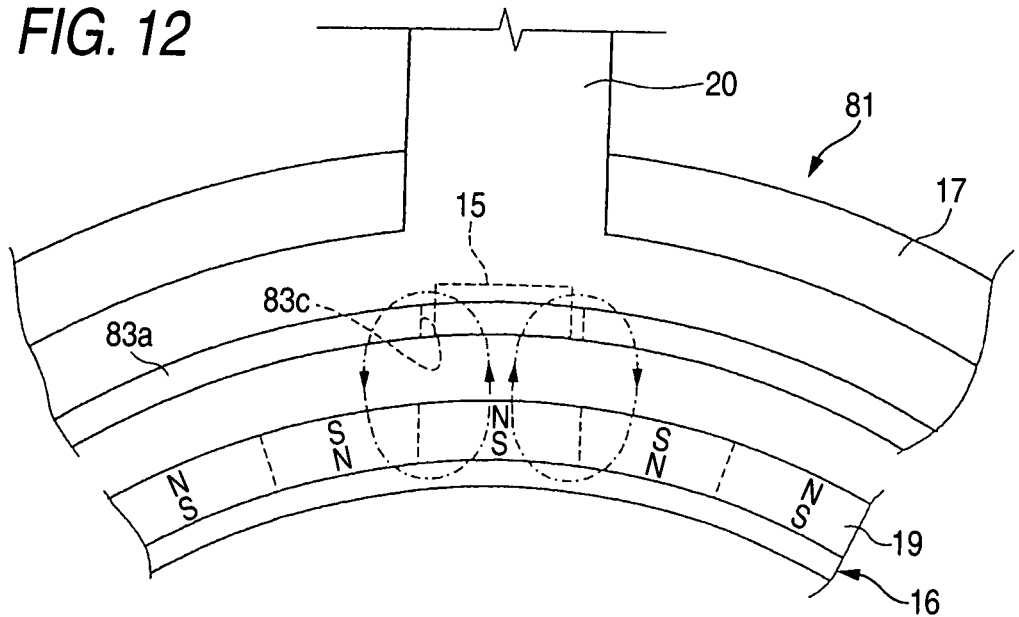
FIG. 12 is a view showing the sealing device illustrated in FIG. 9, wherein the view corresponds to FIG. 3.

FIGS. 11 and 12 are views showing the fourth embodiment. As shown in FIGS. 11 and 12, the detecting face of the magnetic sensor is may be on the same face as the face of the opening end on the inner diameter side of the window 83c and exposed from the outer body 17 made of resin. According to this structure, an interval of the magnetic sensor 15 and the multipolar magnetic rotor 19 can be reduced as small as possible, which is advantageous for enhancing the detecting accuracy of the magnetic sensor 15.

Fifth Embodiment

Figure 13:
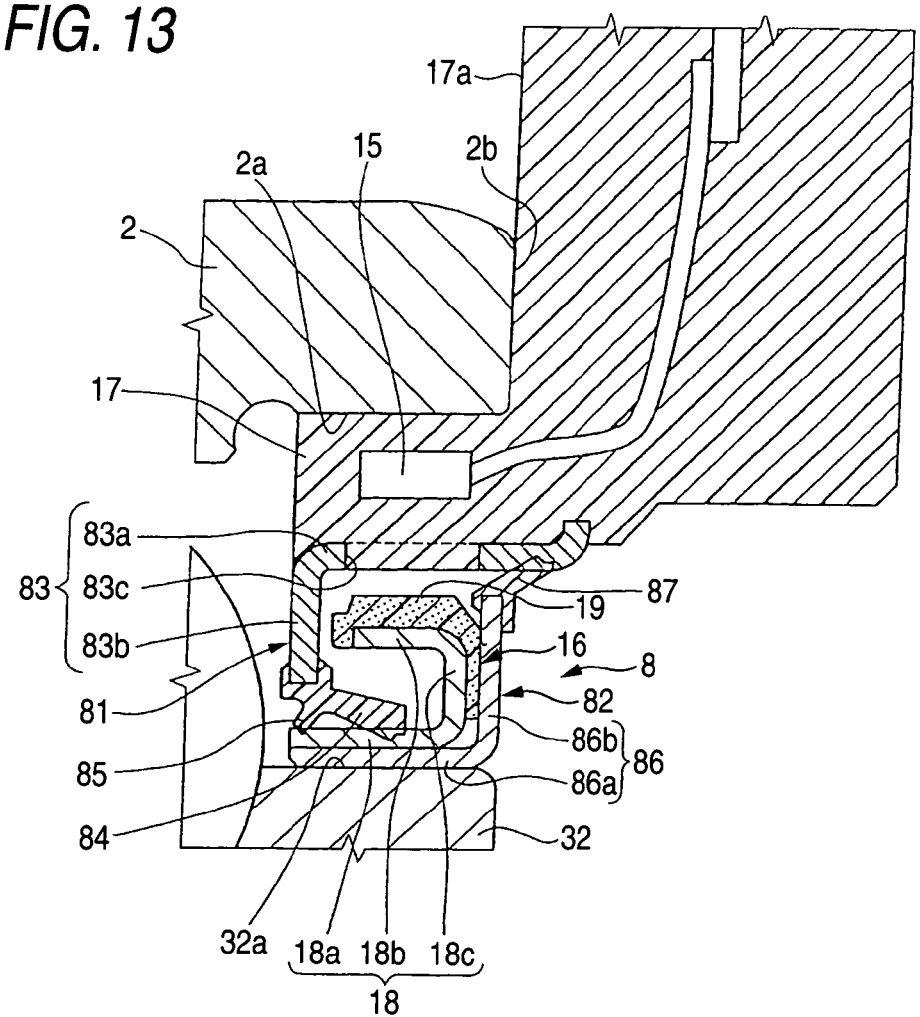
FIG. 13 is a view showing the fifth embodiment of the present invention, wherein the view corresponds to FIG. 2.
Figure 14:
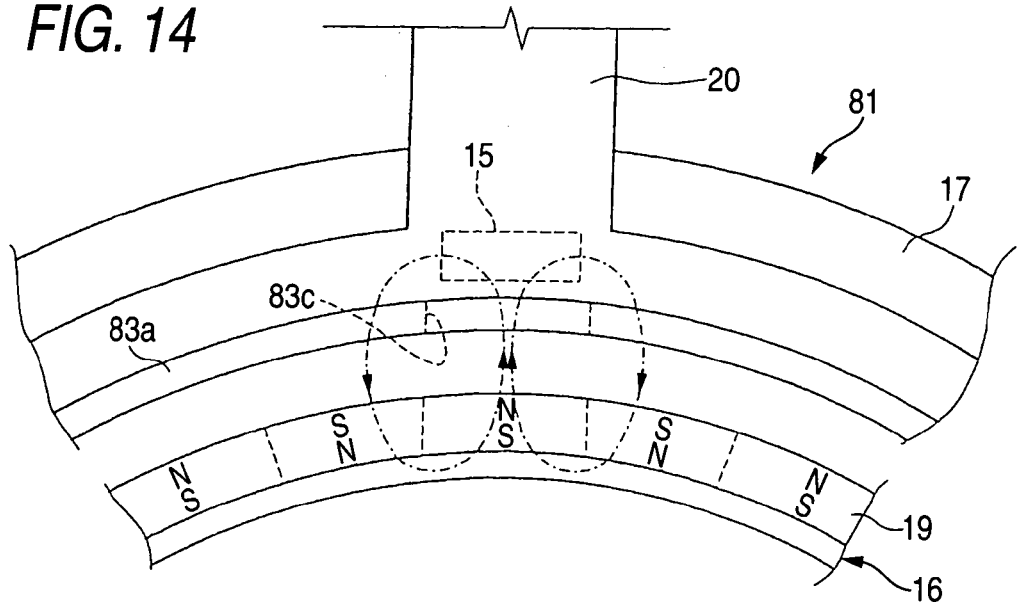
FIG. 14 is a view showing the sealing device illustrated in FIG. 9, wherein the view corresponds to FIG. 3.

FIGS. 13 and 14 are views showing the fifth embodiment. As shown in FIGS. 13 and 14, the magnetic sensor 15 may be separate from the window 83c without being set into the window 83c.

Sixth Embodiment

In the above embodiment, the window 83c provided in the cylindrical portion 83b of the first metallic ring 83 is a through-hole formed in the radial direction. However, this window 83c may be a cutout which is open to the free end side of the cylindrical portion 83b of the first metallic ring 83. In this case, it is preferable that the outer body 17 made of resin is embedded in the cutout portion of the cylindrical portion 83b and the inner circumferential face of the cylindrical portion 83b is made to be on the same face in the circumferential direction so that a sliding face of the lip 87 in the radial direction of the second seal ring 82 can not be interrupted in the circumferential direction.

Seventh Embodiment

Figure 15:
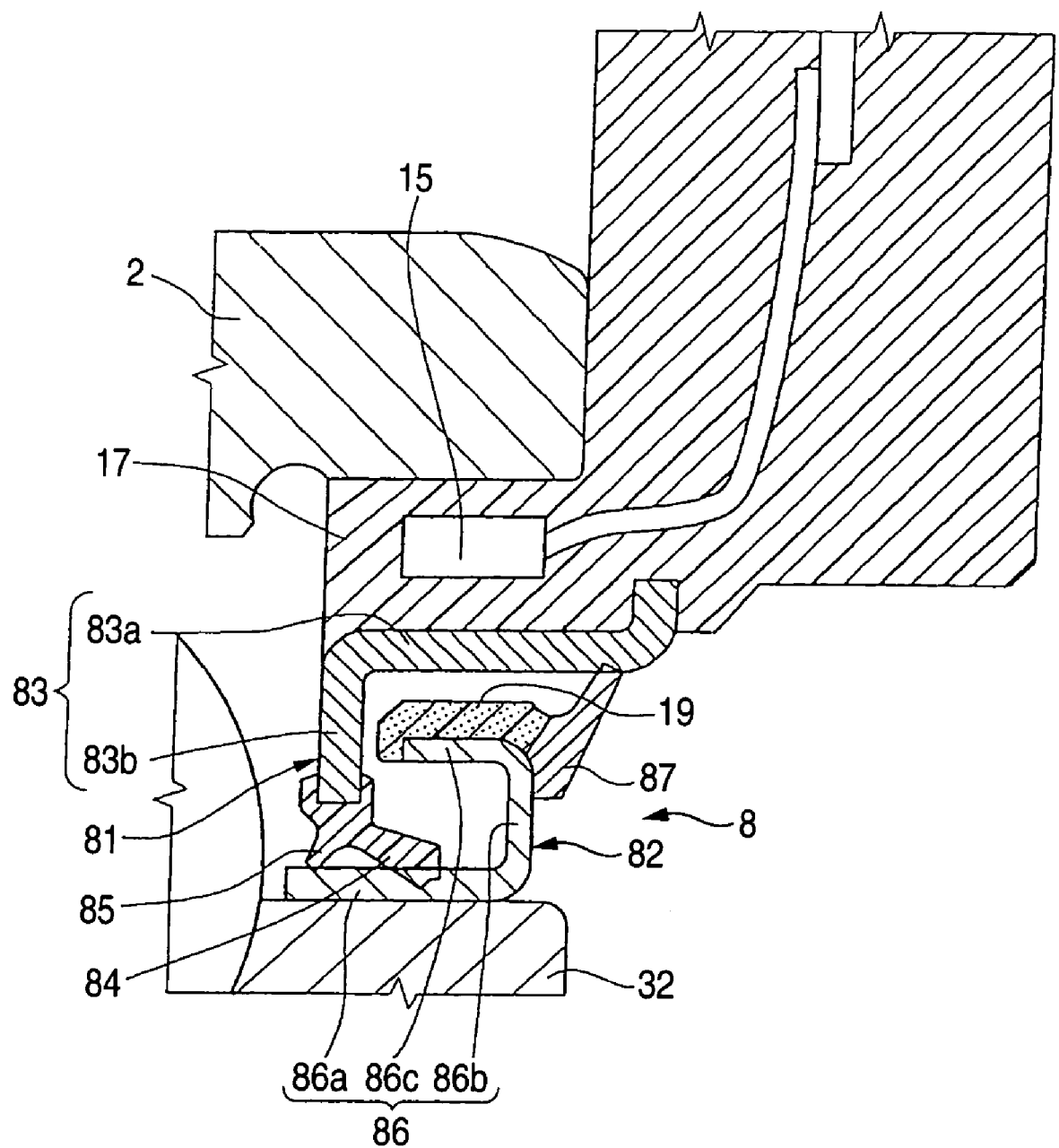
FIG. 15 is a view showing the seventh embodiment of the present invention, wherein the view corresponds to FIG. 2.

FIG. 15 is a view showing the seventh embodiment of the present invention. In this embodiment, the second metallic ring 86 is composed in such a manner that the outer cylindrical portion 86c concentric with the cylindrical portion 86a is integrally connected to the outer circumference of the flange portion 86b. The multipolar magnetic rotor 19 is directly bonded by vulcanization onto the outer circumferential face of the outer cylindrical portion 86c. At the same time, the lip 87 in the radial direction is attached onto the inner side of the vehicle of this multipolar magnetic rotor 19 in such a manner that the lip 87 is arranged being adjacent to the multipolar magnetic rotor 19. Even in this embodiment, in the same manner as that of the embodiment shown in FIG. 2, the lip 87 in the radial direction is made of rubber or resin not containing magnetic powder.

Eighth Embodiment

Figure 16:
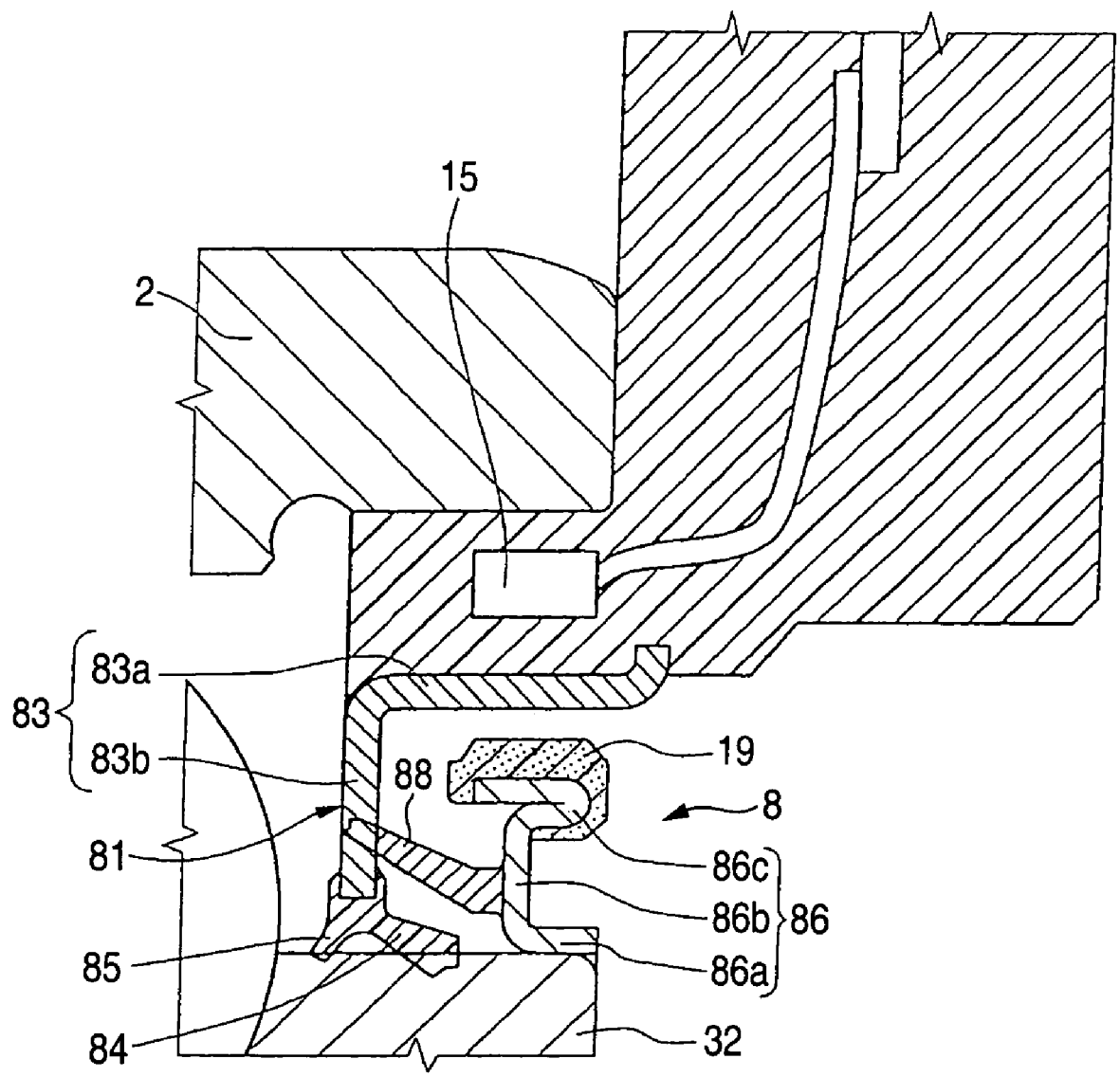
FIG. 16 is a view showing the eighth embodiment of the present invention, wherein the view corresponds to FIG. 2.

Still another embodiment of the second sealing device 8 is shown in FIG. 16. In this embodiment, the second metallic ring 86 is composed in such a manner that the size of the cylindrical portion 86a in the axial direction is decreased and the flange portion 86b extending from the inside of this cylindrical portion 86a to the outside in the radial direction is integrally provided and the outer cylindrical portion 86c is formed by bending the outer circumference of this flange portion 86b into a lateral U-shape. The lip 88 in the axial direction coming into contact with the flange portion 83b of the first metallic ring 83 is bonded by vulcanization onto the inner side face of this flange portion 86b. The multipolar magnetic rotor 19 is directly bonded by vulcanization onto the outer circumferential face of the outer cylindrical portion 86c. Further, the main lip 84 and the auxiliary lip 85 of the first seal ring 81 are made to directly come into contact with the shoulder portion of the outer circumferential face of the inner ring 32. Even in this embodiment, in the same manner as that of the embodiment shown in FIG. 2, the lip 87 in the axial direction is made of rubber or resin not containing magnetic powder.

In the above embodiment, the present invention is applied to a rolling bearing device used for a drive wheel of an automobile. However, the sealing device of the present invention can be applied to a rolling bearing device used for an idle wheel of an automobile although not shown in the drawing. Further, the sealing device of the present invention can be applied to various uses.

What is claimed is:

1. A sealing device comprising:
   a first seal ring that is fixed to an outer ring member;
   a second seal ring that is fixed to an inner ring member capable of relatively, coaxially rotating with respect to the outer ring member; and
   a magnetic sensor that is attached to the first seal ring,
   wherein the second seal ring includes:
      a metallic ring that is engaged with an outer circumference of the inner ring member;
      a lip that is bonded to the metallic ring, and comes into contact with the first seal ring; and
      a pulser ring that is provided in the metallic ring so that the pulser ring can be opposed to the magnetic sensor in the radial direction and is detected by the magnetic sensor,
   wherein the pulser ring includes:
      an annular core portion that includes an inner cylindrical portion provided on an outer circumference of the metallic ring, an outer cylindrical portion arranged coaxially with the inner cylindrical portion, and an annular plate portion for connecting the inner cylindrical portion with the outer cylindrical portion; and
      a multipolar magnetic rotor, in which N-poles and S-poles are alternately arranged in the circumferential direction, and which is bonded to the outer cylindrical portion.

2. A sealing device according to claim 1, wherein the lip comprises rubber or resin.

3. A sealing device according to claim 1, wherein the multipolar magnetic rotor comprises rubber or resin containing magnetic powder.

4. A sealing device according to claim 1, wherein the inner cylindrical portion and the outer cylindrical portion are arranged inside the width in an axial direction defined by the first and the second seal ring.

5. A sealing device according to claim 1, wherein a portion of the multipolar magnetic rotor fills a gap formed between the annular core portion and the metallic ring.

6. A sealing device comprising:
   a first seal ring that is fixed to an outer ring member;
   a second seal ring that is fixed to an inner ring member capable of relatively, coaxially rotating with respect to the outer ring member; and
   a magnetic sensor that is attached to the first seal ring,
   wherein the second seal ring includes a pulser ring that is detected by the magnetic sensor and is provided in a metallic annular ring so that the second seal ring can be opposed to the magnetic sensor in a radial direction,
   wherein the pulser ring includes:
      an annular core portion attached to an outer circumference of the second seal ring; and
      a multipolar magnetic rotor provided on an outer circumferential face of a cylindrical portion of the annular core portion, and
   wherein N-poles and S-poles are alternately arranged in the multipolar magnetic rotor in a circumferential direction, and the multipolar magnetic rotor emits lines of magnetic force, which loop between the magnetic poles, in the radial direction onto a magnetic sensor side.

7. A sealing device according to claim 6, wherein N-poles and S-poles are alternately formed and arranged in the circumferential direction of the multipolar magnetic rotor by magnetizing a base of rubber or resin containing magnetic powder in the radial direction of the multipolar magnetic rotor.

8. A sealing device comprising:
   a first seal ring that is fixed to an outer ring member;
   a second seal ring that is fixed to an inner ring member capable of relatively, coaxially rotating with respect to the outer ring member; and
   a magnetic sensor that is attached to the first seal ring,
   wherein the second seal ring includes:
      a metallic ring that is engaged with an outer circumference of the inner ring member;
      a lip that is bonded to the metallic ring, and comes into contact with the first seal ring; and
      a multipolar magnetic rotor that is provided in the metallic ring so that the multipolar magnetic rotor can be opposed to the magnetic sensor in the radial direction, wherein:
   the multipolar magnetic rotor includes N-poles and S-poles alternately arranged in the circumferential direction, a space being formed between the multipolar magnetic rotor and the first seal ring in the radial direction, and
   the second seal ring includes an annular core portion engaged with an outer circumference of the metallic ring, and the multipolar magnetic rotor is bonded to an outer circumference of the annular core portion.

9. A sealing device according to claim 8, wherein the multipolar magnetic rotor and the lip are separately formed.

10. A sealing device according to claim 8, wherein the magnetic sensor is embedded in an outer body disposed between the outer ring member and the first seal ring.

11. A sealing device according to claim 10, wherein the outer body comprises resin.

12. A sealing device according to claim 10, wherein the outer body comprises connection means for connecting the magnetic sensor to a circuit.

13. A sealing device according to claim 8, wherein the first seal ring is interposed between the magnetic sensor and the multipolar magnetic rotor.

* * * * *